July 26, 1966 D. B. PALL ETAL 3,262,567
FILTER ASSEMBLIES HAVING PRESSURE-RESPONSIVE VALVES
Filed Aug. 20, 1964 4 Sheets-Sheet 1

$\frac{\delta}{t} = \frac{\text{DEFLECTION}}{\text{DISK THICKNESS}}$

July 26, 1966 D. B. PALL ET AL 3,262,567
FILTER ASSEMBLIES HAVING PRESSURE-RESPONSIVE VALVES
Filed Aug. 20, 1964 4 Sheets-Sheet 2

United States Patent Office 3,262,567
Patented July 26, 1966

3,262,567
FILTER ASSEMBLIES HAVING PRESSURE-RESPONSIVE VALVES
David B. Pall, Roslyn Estates, and Harry Cordes, Cortland, N.Y., assignors to Pall Corporation, Glen Cove, N.Y., a corporation of New York
Filed Aug. 20, 1964, Ser. No. 390,798
11 Claims. (Cl. 210—130)

This application is a continuation-in-part of application Serial No. 6,150, filed February 2, 1960, and now Patent No. 3,164,164.

This invention relates to filter assemblies incorporating pressure-responsive relief and regulating valves in which the valve element is in the form of an annular spring disk.

Relief valves ordinarily employ a spring-loaded valve seal which is forced from its seat and thus opens the valve when a predetermined pressure differential across the valve is exceeded. A typical structure is shown in U.S. Patent No. 2,704,548 to Ralston, issued March 22, 1955. Ralston spring-biases a valve poppet against the valve seat, and mounts the poppet on a flexible diaphragm to seal off the spring. This arrangement has the important advantage of sealing off the spring from dirt which would obstruct its movement, a serious problem when the valve mechanism includes sliding parts. However, springs are not ideal for this purpose, because they have linear characteristics. The pressure required to move the poppet in a structure of this type is directly proportional to the pressure exerted by the spring, and this increases as the spring is compressed. Once the valve has cracked, a considerably higher pressure is necessary to open the valve wider. Frequently, it is desirable to have a certain minimum flow-through when a valve cracks open at the predetermined pressure, and a possibility of a considerably higher flow-through without any, or at only a small further increase in pressure. This a spring-loaded valve is unable to do.

In accordance with the invention, filter assemblies or units are provided having a pressure-responsive relief valve which gives a large predetermined opening at a given pressure differential across the valve, so that a large relief volume of flow through can be obtained at the valve cracking pressure. This valve employs an annular spring disk biased against a valve seat, and arranged to move out from engagement with the seat at a predetermined pressure differential, the crack-open pressure, thus exposing an annular opening bypassing the filter to maintain a relief flow whenever the filtered flow through the filter element is reduced to below a certain minimum.

The disk normally is bowed against the direction of flow, for maximum spring resistance, but it can also be bowed towards the direction of flow, or not bowed at all, as desired, to accommodate any pressure differential and flow condition. It can be made so as to flex open to a position at which it is self-closing when pressure is reduced, or to snap fully open in a position in which it becomes bowed in the reverse direction, and must be reset manually.

The required volume of flow through is provided by so dimensioning the disk and valve seat as to give an annular opening of the predetermined flow capacity when the valve opens. Thus, disk thickness, amount of bow, disk diameter and annular opening diameter are determined by the pressure differential to be resisted, i.e., the resistance to be offered by the spring action of the disk and the strength required to resist the stresses at that pressure, and by the flow capacity required to relieve the excess pressure differential due to blocking of the filter.

The curves of FIGURE 1 show the relationship between the load factor $C_1$, an indication of total deflecting force, or pressure differential, on the valve, and $\delta/t$ the ratio of the deflection ($\delta$) of the disk from its stable height $h$ to effective disk thickness ($t$) ($t$ is a constant for a given disk). The numerical values shown are for a selected number of steel disks of the Belleville washer type. The curves are characterized by the ratio of height of disk ($h$) to thickness of disk ($t$).

These curves are suitable for disks of both constant or radially varying thickness. The thickness ($t$) of disks of nonuniform thickness is determined as the mean square root of the extremes of the greatest and least thickness of the disk, assuming a constant rate of change of thickness along the radius of the disk.

When the curve passes through 0, i.e., for a steel disk, and the ratio of height-to-thickness ($h/t$) is greater than about 2.75, the valve will not flex open gradually, but will snap through, i.e., the bow of the spring is reversed and the washer conforms to a stable position at the other end of its travel. This is a nonreversible disk and requires that the valve be manually closed. A reversible disk is obtained when the curve does not pass through 0, i.e., for a steel disk, and the $h/t$ ratio is within the range from 1.5 to about 2.75. Such valves are desirable in those situations where it is not desirable to take apart the system after each malfunction or increase in the pressure to reset the valve to its closed position.

For optimum results, the valve should be designed so as to "crack" in the region A—A on the curves of FIGURE 1 for the particular washer used. $C_1$ reaches its maximum value in this region of the curves where the slope is approximately zero. The optimum range of travel for any given disk is between region A—A and the minimum $C_1$ value region, for example, between points B and C on the 2.0 curve, where the force required to keep a disk flexed a certain amount decreases as the amount of flexure increases. If necessary to obtain a greater flow under certain conditions, the disk may be allowed to flex to a deflection greater than at point C. It should be noted at this point that this system does not behave in the same manner as one with a constant applied force. When the valve cracks at $C_1$ maximum (at point B), the pressure immediately drops, so that the disk will not "snap" through to a point D, as would be the case for a constant force system, but rather stabilizes at an intermediate point between B and C, opening and closing automatically as the flow through the primary system varies.

Point E on the graph for $h/t=2.0$ is at the point where $\delta/t$ also is equal to 2.0. At this position the disk is flat and $\delta=h$.

It is generally preferable that $h/t$ be greater than 1.5. Below this value the load factor increases with $\delta/t$ and therefore does not exhibit the properties described herein.

In determining the washer that should be used for a particular system, the following procedure may be followed: Usually design requirements will determine the radii of the annular disk, e.g., the radii of the disk may be determined by the diameter of the pipe used in the system. For example, in the filter of FIGURE 6, the inside radius is limited by the fluid flow required through passage 46 and therefore through the central hole in the washer; the ratio of inside radius to outside radius is usually within the range from about 1.4:1 to about 2:1.

Once the diameters are set, the surface area of the annular disk is easily calculated and the total force against the washer surface at the desired "crack-open" pressure differential across the valve may also be calculated.

The size of the relief opening required to pass the full flow, in case of a complete blockage of the filter must be calculated and the necessary deflection of the disk is determined.

The material to be used for the washer is determined to a large extent by the corrosivity of the fluid in the system, the operating pressures and cost. A tentative choice of material should be made which may be changed if it is found unable to withstand the necessary stress when the following computations are worked through.

Further computation is by trial and error, using the following equation and the curves of FIGURE 1, which are taken from the SAE monograph, "Manual on Design and Manufacture of Coned Disk Springs," TR–63. The basic formula for determining the washer dimensions for washers of uniform thickness is derived from the following equations:

I.

(A) Where the outer periphery, or radial edge, flexes to open $$P' = \Delta \left[ r^2 \frac{\pi}{3} (a-1)(2a+1) \right]$$

(B) Where the inner periphery, or radial edge flexes to open $$P' = \Delta \left[ r^2 \frac{\pi}{3} (a-1)(a+2) \right]$$

II.

$$P' = \frac{C_1 C E t^4 (R-r)}{aR^2}$$

(derived from Equations 1 and 2 on pages 10 and 11, ibid.)

where $P'$ is the total force on the washer at the crack open point, $\Delta$ is the pressure at the crack-open point, $C$ is a constant for a given washer determined from a chart of $R/rvC$ on page 12, ibid., $E$ is a modulus of elasticity of the material chosen for the spring and $\alpha$ is the ratio of $R/r$; the other values are defined above. By assuming a "$t$," calculating $C_1$ at the crack open pressure from the above formulae and then by finding, on FIGURE 1, the curve having a $C_1$ maximum equal to that, the height of the disk will be determined.

When the operator requires a flex disk, it is of course necessary that the curve for the disk chosen not pass through zero, i.e., for a steel disk, that the $h/t$ ratio of the chosen disk be in the range of 1.5–about 2.75. If this procedure results in a disk having an $h/t$ ratio outside of this range it would of course be necessary to vary the radius (inner, outer, or both) or to choose a different material, depending on the requirements of the system.

A steel snap valve requires an $h/t$ ratio greater than about 2.75. As the snap valve will have the same range of travel as the flex type, the calculation for determining the annular opening necessary for full flow is the same.

To check the suitability of the material and thickness of the washer chosen, the stress on the washer at the "cracking" pressure must be determined and compared with the strength of the chosen washer. If the stress is too great, either the thickness of the washer will have to be increased or a stronger material chosen and a new calculation made. Similarly, it will have to be checked that the maximum deflection required for full flow is not at a point on the particular curve of FIGURE 1 beyond $C_1$ min. (pt. C on curve for $h/t=2$).

For washers having radially tapered thickness, similar calculation may be made utilizing the above equations and charts but substituting the effective thickness for "$t$," which is the mean square root of the thickness (see also Brecht and Wahl, "Radially Tapered Disk Springs," Trans. ASME 1930, A.P.M. 52–4).

Fluid flow conditions of all kinds can be met by appropriate design of the spring disk to any load-deflection characteristics required in the system. The geometry of these disks is established by the disks' outside diameter and inside diameter, its free height (measured from the inside edge along the perpendicular to the outside edge) and its thickness. Proper selection of the geometry, using mathematical tables and equations of Fortini, Machine Design, September 4, 1958, "Conical-Disc Springs," will give a valve capable of pressure-relieving response to any type of load in any desired way. Valves can be designed that are capable of relieving pressure and decreasing pressure drop down to a minimum, almost zero, with or without a change in direction of bow, as desired, and without any further increase in pressure beyond the crack-open pressure.

The spring disk of the invention is made of material of high yield strength and high hardness. Materials having minimum yield strengths of 30,000 to 250,000 p.s.i.g. can be used, with Rockwell hardness of the order of C–45. Steel, stainless steel, and nickel chromium alloys are satisfactory, as also are certain synthetic resins such as polytetrafluoroethylene polyoxymethylene and polymers of glycols and dicarboxylic acids such as ethylene glycol and terephthalic acid (Mylar). Metal spring disks of the desired type are available, and are known as Belleville washers.

When the spring disk is made of metal, it can, if desired, be coated with a thin layer of a resilient material to aid in sealing off leakage of fluid through the valve when the disk is in engagement with the valve seat. The resilient coating can extend over the entire disk or over only that portion of the disk in contact with the valve seat. The resilient coating is preferably made of a polymeric material, which can be either plastic or elastomeric. Representative coating materials include natural rubber, any of the synthetic rubbers such as SBR, Butyl rubber, neoprene, and polybutadiene, polyhalocarbons such as polytetrafluoroethylene ("Teflon") and polytrifluorochloroethylene ("Kel-F"), polyolefins such as polyethylene and polypropylene, and chlorinated polyolefins, as well as polyvinyl chloride. The coating material should be inert to the fluid used in the system, and be capable of withstanding the temperature of operation.

The disk can take a variety of forms and shapes. The disk can be disposed surrounding the valve seat, i.e., a washer, or it can be arranged to contact the valve seat on one surface, or on both surfaces. The configuration of the disk is not critical, but can be fashioned to fit any need. For example, the disk need not be round, nor need the central aperture be necessarily of a shape identical to that of the outside surface, so that the central hole may be ovoid while the outer surface is circular. Similarly, the aperture need not be centered, or concentric with the outer surface. The disk can be arranged to seat in either direction of bow, so that the valve can be reversible, i.e., responsive to differential pressures exerted from either side of the disk, as shown in FIGURES 4 and 7.

The valve seat can be made of the same or of different materials. It is advantageous under some conditions to fabricate the valve seat of material more resilient than that used for the disk. For good corrosion resistance, all parts of the valve can be of stainless steel.

Several embodiments of filter assemblies embodying valve structures in accordance with the invention are shown in the drawings, in which.

Figure 1:
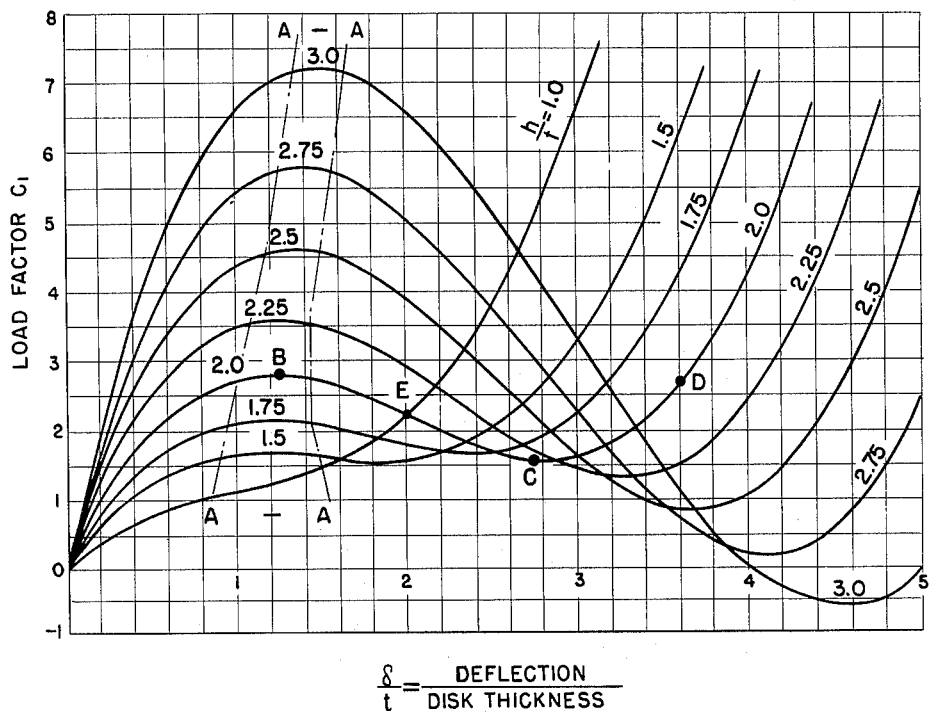
Figure 2:
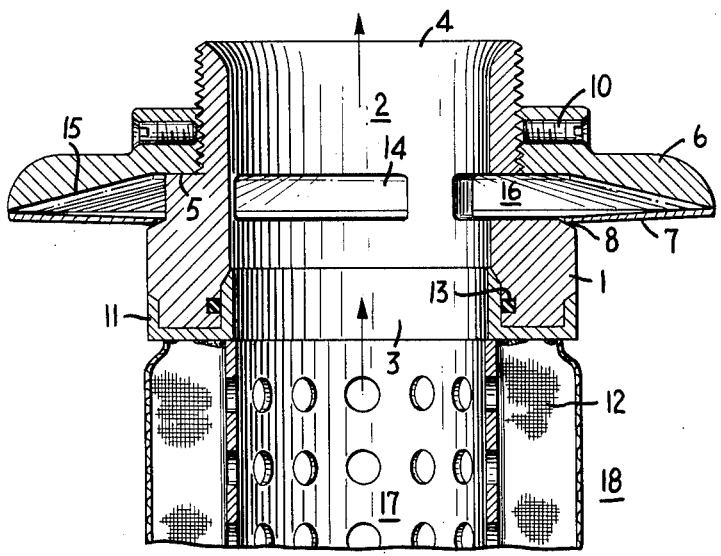
FIGURE 2 is a partial central vertical sectional view through a filter assembly incorporating a pressure-responsive relief valve of the invention using an annular snap spring disk which surrounds the valve seat.

The relief valve of FIGURE 2 comprises a housing 1 provided with a central passage 2 having inlet and outlet ports. Fixed on a ledge 5 between port 3 and port 4 of the housing is an annular disk 6, which supports an annular Belleville spring-type stainless steel disk washer 7, the central portion of which seats on a ledge 8 on the exterior of the housing 1. In this instance the disk washer is tapered radially such that it is thinner at its inner edge. This taper is optional and its usefulness depends on the spring characteristics required. The washer has an $h/t$ greater than about 2.75. The inner edge of the washer engages the housing to form a fluid-tight seal therewith, and prevent leakage. The outer periphery of the washer is spring-biased against the outer edge of the disk 6, forming a fluid-tight seal therewith.

The washer 7 is removable, being held in position by the disk 6, which is locked into place on the housing 1 by the set screws 10.

The outer edge of the end cap 11 of a cylindrical filter element 12 engages the lower sides of the housing 1, and is sealed at port 3 against leakage by an O-type sealing element 13, the faces of which respectively engage the housing and the end cap. O-ring 13 is not essential; it can be omitted, in which event the housing 1 seats against the end cap 11. The O-ring can be of resilient material, such as rubber.

A plurality of openings 14 are provided in the housing 1, opening on the upper side of the washer 7. The shaped inwardly projecting lower face 15 of the disk 6 provides the limit for flexing of the disk 7, when it snaps open, to the position shown in dotted lines, and defines a passage 16 between the washer 7 and openings 14. The washer is of the spring type, and is biased against the ledge 8 of the housing 1 at a force to resist a predetermined pressure differential between the central passage 17 of the filter, and hence passage 2 of the housing, and the space 18 outside the filter. The force can be adjusted by adjusting the position of the disk 6 on the housing 1 to provide more or less space for the washer.

In operation, when the pressure of liquid in the space 18 exceeds the spring force of the washer, the washer snaps open, and the annular portion moves upwardly, assuming the position shown by the dotted lines, so that the upper side of the washer now abuts against the lower face 15 of the disk 6, thus opening the passage 16 between the space 18 and the openings 14, through which liquid may flow into the passage 2 and bypass the filter 12. The washer can then be reset in closed position manually when the filter element is replaced.

Figure 3:
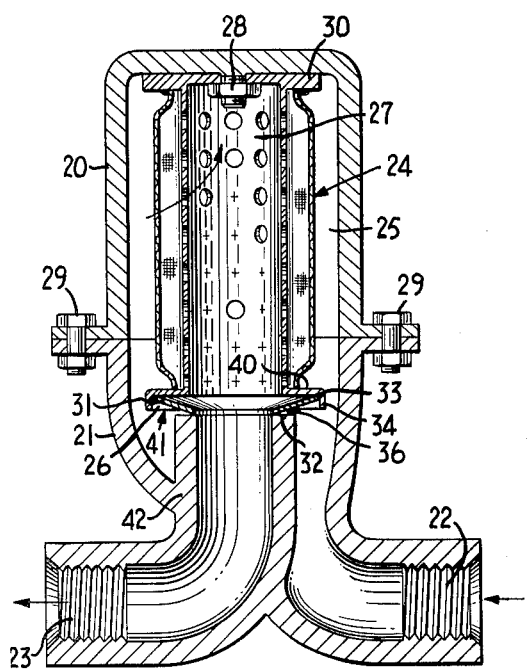
FIGURE 3 is a central vertical sectional view through a filter assembly incorporating a relief valve in accordance with the invention, using an annular flex spring disk which surrounds the valve seat.

The filter structure of FIGURE 3 comprises a two piece housing 20 and 21, held together by bolts 29. The head part 21 of the housing is provided with inlet and outlet passages 22 and 23, respectively, communicating to the opposite sides of a cylindrical filter element 24. The passage 22 opens into the peripheral portion 25 of the chamber within the bowl portion 20. The filter element 24 encloses a central passage 27 within the bowl 20 which communicates with the outlet passage 23.

The filter element is composed of any desirable filtering material, for example, a sinter-bonded wire mesh prepared in accordance with U.S. Patents Nos. 2,925,650 and 3,049,796. The end cap 30 of the element is attached to the housing 20 by the nut 28, and the other end cap 40 supports a relief valve 41 of the invention, which is fitted in chamber 26 of the end cap 40 between the filter element 24 and the inner end of passage 23. The outside edge 33 of the Belleville washer is held in a leakproof seal against the flange 34 of the end cap 40. Since, in the structure shown, passage 22 is the inlet passage and passage 23 the outlet passage, the spring washer 31 is accordingly bowed against the direction of flow. The spring washer 31 is adapted to resist increasing fluid pressures in the inlet passage 22 up to a predetermined pressure differential across the filter element 24, and while closed directs fluid entering the filter structure via the inlet passage 22 through the filter element 24 to the channel 27 and thence to the outlet 23. However, whenever the filter becomes partially clogged, and the pressure differential between the inlet and the outlet reaches a predetermined value, which corresponds to the rated resistant spring force of the Belleville washer 31, the washer flexes open, but does not snap so that the bow reverses direction. This particular washer has an $h/t$ ratio of 2.25. As the amount of blockage in the filter increases, the washer flexes open more so as to accommodate the greater flow requirement bypassing the filter. An annular opening 36 is formed when the washer flexes between the washer and the end face 32 of the housing, and the size of the opening is proportional to the amount of blocking of the filter; there is thus maintained a head of pressure at the inlet side sufficient to force such fluid as can to pass through the filter, while a sufficient proportion of fluid entering through the inlet 22 can bypass the filter via opening 36 directly into the outlet 23, to maintain flow on the outlet side as well.

Figure 4:
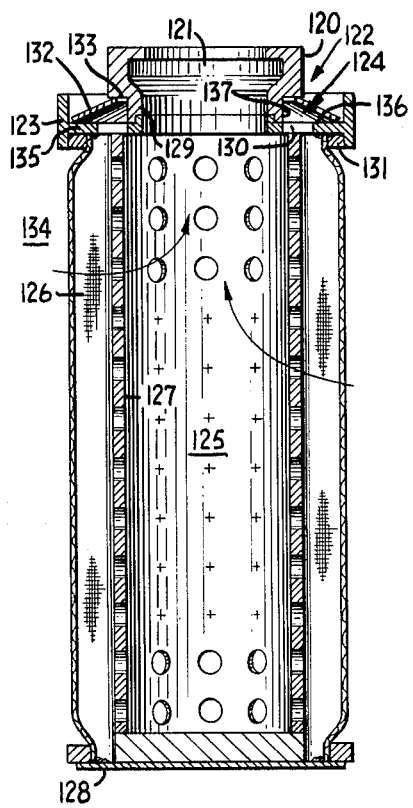
FIGURE 4 is a central vertical sectional view of an embodiment of filter element incorporating in an end cap a pressure-responsive relief valve in accordance with the invention.

The filter element shown in FIGURE 4 incorporates the relief valve in an end cap of a filter element.

The end cap 120 has a central passage 121 and is adapted to fit on a head of a filter assembly. The relief valve assembly 122 is positioned at the inner end of the end cap 120, and comprises an annular insert 123 having a central passage 124 therethrough, connecting with the passage 121 of the end cap and cylindrical inner passage 125 enclosed by the filter element 126. The filter element is supported on a perforated metal core 127, and held between the top end cap 120 and lower end cap 128, which closes off passage 125 at the bottom.

The insert 123 is shaped exteriorly to fit on the lower portion 129 of the cap 120 by a press fit, and is bonded thereto by resin. The insert 123 is also bonded as by welding to the top of filter element 126 via enclosing ring 131.

The central passage 124 of the insert is closed at its outer annulus enclosing the cap 120 by the annular flex spring stainless steel disk 132, which seats on its upper surface adjacent its central opening against the annular valve seat 133 at the bottom of the cap 120. The disk has an $h/t$ ratio 1.5. The disk is bowed towards space 134 outside the filter element, and is adapted to flex away from this seat under pressure on its upper side from fluid in the space 134.

The disk 132 is supported at its outer periphery on the ledge portion 135 formed in the insert 123. The disk is also adapted to flex away from the ledge under pressure from liquid on its underside, in the passage 124.

In operation, the disk 132 normally seals off space 134 from passages 121, 124 and 125. Should the filter become plugged, so that the differential pressure between these passages exceeds the rated resistance force of the disk, its central portion flexes downwardly and away from the seat 133, and opens an annular passage between it and the seat 133. The maximum limit of this opening is determined by the depth of the space 137 into which the washer can flex until it abuts the upper surface 136 of the insert 123.

When the disk is opened, fluid can bypass the filter, passing through the passage 124 in the insert 123 into the passage 121.

The disk can also respond to a differential in pressure when the flow through the filter is in the reverse direction. In this event, the flow of liquid to be filtered enters the filter assembly via passage 121. When a sufficient differential pressure between the passage 121 and space 134 is reached, exceeding the rated resistance force of the disk at its outer periphery, the outer peripheral portion of the disk is lifted upwardly away from the ledge 135, opening a passage between the disk and the ledge for flow of liquid from the passages 121 and 124 into the space 134, thus bypassing the filter.

The filter assembly of FIGURE 4 is primarily designed for a flow in the direction shown in the figure, since the housing 120 limits the opening between the disk 132 and the ledge 135 to a narrow space 66, so that when flow is in the reverse direction, there is a possibility of this being plugged by dirt carried past the filter, thus rendering the valve inoperative.

Figure 5:
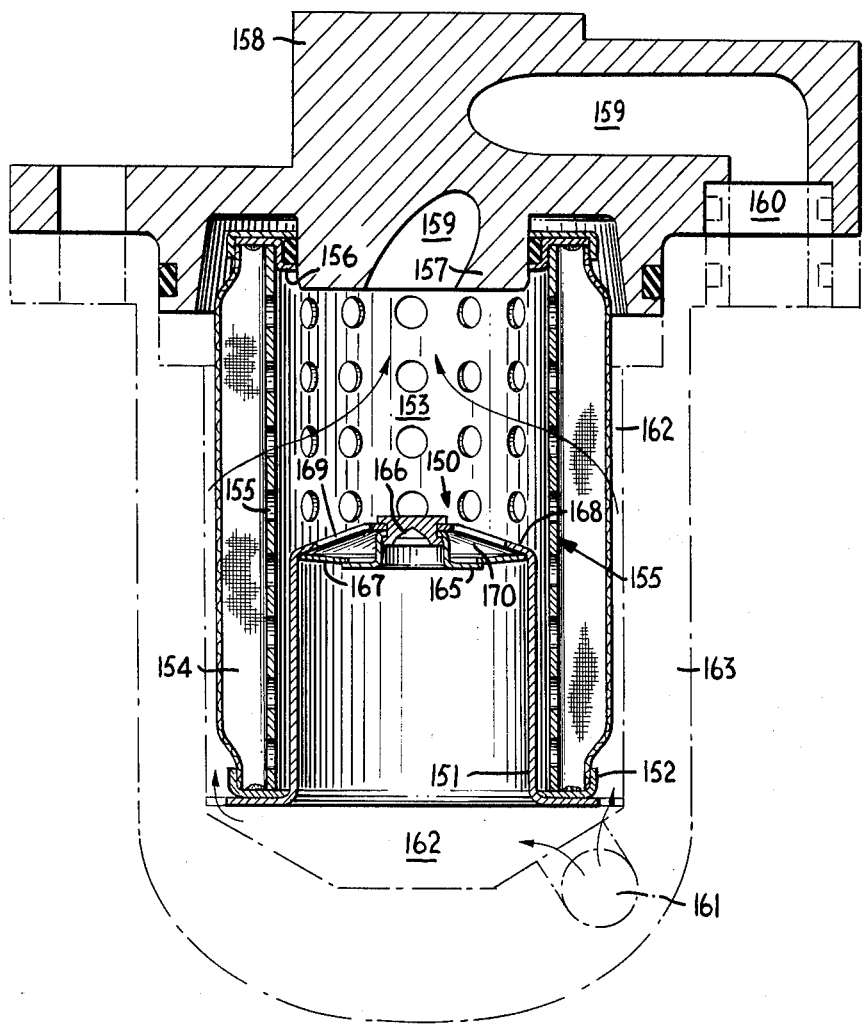
FIGURE 5 is a vertical sectional view of another embodiment of filter element including a relief valve in accordance with the invention.

The filter element of FIGURE 5 has the relief valve supported in the central passage of the filter.

The relief valve assembly 150 in this case is carried on insert 151 fitting within the lower open end cap 152 of the filter and closing off the central passage 153 thereof. The filter 154 is supported on a perforated core 155 between the lower end cap 152 and upper end cap 156, which in turn fits over the lower extension 157 of the filter head 158. The central passage 153 thus connects with passage 159 of the head, leading to the outlet port 160. Inlet passage 161 leads to the space 162 outside the filter and within the bowl 163.

The relief valve assembly is supported on the disk 165, centrally held by rivet 166 to the crest of the insert 151. A Belleville washer or disk 167 of stainless steel is held between the disk 165 and the inside face of the top 168 of insert 151, the inner periphery of the washer 167 engaging the disk 165, and the outer periphery the insert 151, in a fluid-tight seal. The washer which has an $h/t$ ratio of 2.75 is bowed towards the direction of fluid flow, normally seals off the space 162 and passage 153, so that all flow must pass through the filter 154. When a sufficient differential pressure is reached between space 162 and passage 153, exceeding the rated resistance force of the disk 167, the inner periphery of the disk snaps away from the disk 165, opening an annular passage for bypassing the filter via space 170 and openings 169 directly into passage 153.

The top 168 of the insert 151 is provided with a plurality of openings 169 opening into space 70 above the washer 167. Thus, whenever the washer snaps away from the disk 165, a way is opened for fluid to pass from space 162 through space 170 and openings 169 to passage 153.

Figure 6:
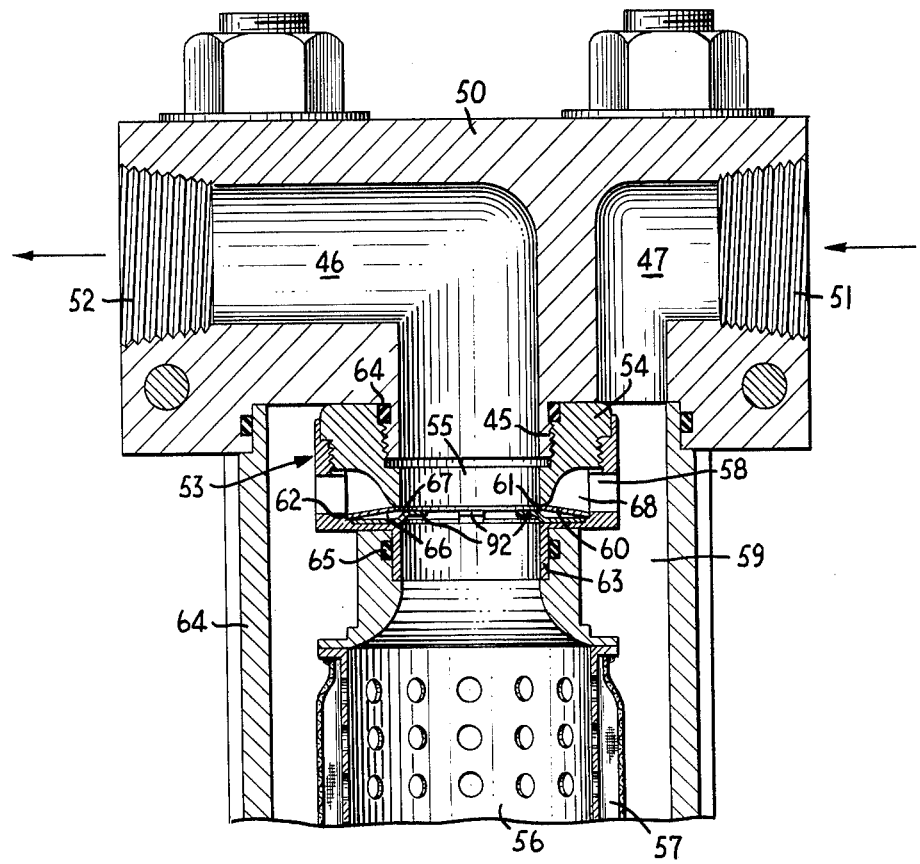
FIGURE 6 is a partial vertical sectional view of a filter assembly incorporating a relief valve in accordance with the invention, using a surface-seating snap spring disk.

The filter assembly of FIGURE 6 comprises a head 50 having an inlet port 51 and an outlet port 52 leading to inlet passage 47 and outlet passage 46 therein. The relief valve assembly 53 is positioned at the inner end of the outlet passage 46, and comprises two annular inserts 54 and 63, and a snap spring disk washer 60.

The annular insert 54 is threadably attached to a dependent portion 45 of the head 50 and has a central passage 55 therethrough, connecting the outlet passage 46 with the inner passage 56 enclosed by the filter element 57. The insert 54 is shaped exteriorly to receive a second insert 63, which can be threaded as shown, or press fit, on the outside of the insert 54. The insert 63 is provided with a plurality of side passages 58 opening into the exterior passage 59 of the filter assembly. These passages are closed at their inner end by the annual snap spring disk 60, which is of stainless steel and seats on its upper surface adjacent its central opening against the annular valve seat 61 at the bottom of the insert 54. The disk is adapted to move away from this seat whenever the fluid pressure on its upper side from fluid in the passage 58 exceeds the fluid pressure on its lower side by a predetermined amount.

The disk 60 is supported at its outer periphery on the ledge portion 62 formed in the insert 63. To ensure a tight seal between the inserts, the filter, and the housing, O-ring seals 64 and 65 are provided where the inserts 54 and 63 join the housing and filter, respectively.

In operation, the disk 60 normally seals off passages 56 and 59. Should the filter 57 become plugged, so that the differential pressure between these passages exceeds the rated resistance force at the central portion of the disk, the disk 60 snaps downwardly at the center and away from the seat 61, and opens an annular passage 67 between it and the seat 61.

The maximum limit of this opening is determined by the depth of the space 66, since the washer can snap downwardly into space 66 only until it abuts the upper surface of the insert 63.

While the disk is held open, fluid can bypass the filter 57, passing through the passages 58 in the insert 63 into the passage 67, and thence into passage 55 and 46 to the outlet 52.

When it is required to use the fast-opening snap type of valve, and it is also important that the valve be able to return to its closed position without the necessity of taking apart the unit, finger spring 92 may be attached to ledge 62 in insert 63.

In operation, when the pressure differential across the disk reaches the cracking pressure, the disk snaps open, opening an annular space 67 between the seat 61 and the inner edge. The disk also depresses the finger spring 92 as it snaps to its fully open position. The finger spring should be designed so that the force exerted by the finger against the disk is great enough to snap it back to its closed position when the flow through is turned off entirely or slackened after the plugged filter is cleared.

A flex disk, used in place of the snap disk shown, can also respond to a pressure differential when the flow through the filter is in reverse direction. The disk is adapted to flex away from the ledge 62 whenever the fluid pressure on its underside, in the space 66, exceeds the fluid pressure on its upper side by a predetermined amount. The space 66 below the disk washer 60 thus allows for movement of the disk away from the valve seat 61, and also provides for entry of fluid against the periphery of the disk on its underside.

Under reverse flow, the flow of liquid to be filtered enters the filter assembly at port 52, proceeds through passages 46, 56, and filter element 57 into passage 59 and passage 47, and leaves at port 51. When a sufficient differential pressure between the passages 56 and 59 is reached, exceeding the rated resistance force of the disk at its outer periphery, the outer peripheral portion of the disk 60 flexes upwardly, and is lifted away from the ledge 62, opening a passage 68 between the disk and the ledge for flow of liquid from the passage 56 through passage 68 into the passage 58, and thence into the passage 59, thus bypassing the filter, to emerge eventually at port 51.

The filter assembly of FIGURE 6 is primarily designed for a flow in the direction shown in the figure. The space 66 is rather narrow, to limit the opening between the disk 60 and the valve seat 61, so narrow that when flow is in the reverse direction, there is a possibility of this being plugged by dirt carried past the filter, thus rendering the valve inoperative. A construction in which the valve is truly reversible under all conditions is shown in FIGURE 7.

Figure 7:
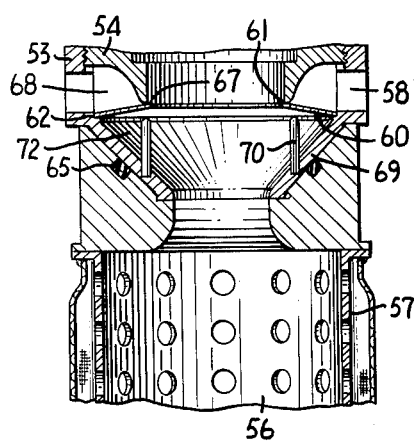
FIGURE 7 is a view of another form of the relief valve of FIGURE 6, especially arranged for reversible response to differential pressures in either direction of flow.

The relief valve assembly of FIGURE 7 is identical with that of FIGURE 6, save for the configuration of the lower insert 69. Instead of having a right angle configuration, as shown in FIGURE 6, to limit the amount of flex of the disk 60 from the valve seat 61, it now is curved sharply away from the disk, beginning at the ledge 62, so as to provide a large opening 72 for entry of liquid against the lower peripheral portion of the disk. In order to supply support from below for the disk at its central position opposite its seat 61, a plurality of prongs 70 are provided, attached to the insert 69. These are spaced from the seat 61, to provide for the desired amount of flex for the disk, and also to limit the amount of stress to which the disk is subjected.

In operation, for flow in the normal direction, the operation is exactly as in FIGURE 6. The disk 60 normally seals off the passages 56 and 58, and when a sufficient differential pressure is reached between these passages, exceeding the rated resistance force of the disk, the central portion of the disk flexes away from the seat 61, opening an annular passage 67 for bypassing the filter.

When the flow is in the reverse direction, entering the filter assembly at port 52 and leaving at port 51, fluid in the space 72 can at a sufficiently high differential pressure force the peripheral portion of the disk upwardly, away from the ledge 62, and open an annular passage 73 therebetween for bypass of the filter.

Figure 8:
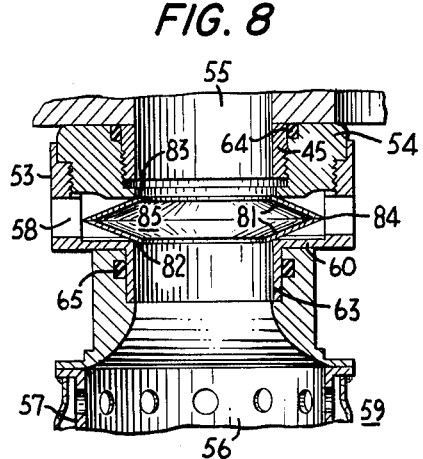
FIGURE 8 is a view of another form of the relief valve of FIGURE 6 utilizing two valve disks seated against each other.

The relief valve assembly of FIGURE 8 is identical with that of FIGURE 6 or 7, save for the configuration of inserts 53 and 54 and the use of two valve disks 81 which are seated against each other at their outer radial edge. These disks 81 also seat against ledges 82 and 83 at their inner radial edges.

In operation, the disks 81 generally seal off channel 58 and space 85. However, should a malfunction occur and the filter become plugged, if the pressure differential between spaces 56 and 59 exceeds the rated resistance force of the disks, the disks 81 will flex away from each other at their outer edges opening an annular passage between space 85 and passage 58 thereby relieving the excessive pressure differential.

This system is also capable of operation when the flow is in the reverse direction so that the pressure is greater in the inside space 56. In this situation, the disks 81 flex inwardly at their inner peripheries away from ledges 82 and 83, respectively, opening two annular passages connecting passage 58 to space 85.

It is also feasible to employ two disks seated against each other at their inner peripheral surface with the outer peripheral edges seated against the insert body.

Other arrangements for paired spring disks will be apparent to those skilled in this art, and all such arrangements are encompassed by the claims which follow.

The relief valves of the invention are quite simple and inexpensive to construct. Since the valve itself has no sliding parts, it is friction-free, and cannot jam as a result of dirt collecting in the annulus. At the same time, the spring disk can be made thin enough so as to flex against the valve seat, giving very tight seating with extremely low leakage rates up to the crack-open pressure. Since there are no parts requiring lubrication, the valves can be used equally well with both lubricating and non-lubricating fluids.

A plurality of spring disks can be employed in series or in parallel in any pressure-responsive valve. In series, the first can be made to operate a pressure indicator at a lower crack-open pressure than the second; so as to give advance warning that the pressure is approaching the limit at which a bypass line is opened. In parallel, the spring disks can be adapted to open at different pressures, so as to enlarge the bypass opening at higher pressures, or made so that all open at the same crack-open pressure, to give a maximum bypass opening at the crack-open pressure.

We claim:

1. A filter assembly comprising a housing, intercommunicating inlet and outlet passages therein, a filter disposed across the line of flow between the inlet and outlet passages so that the flow therebetween passes through the filter, a relief passage for fluid flow between the inlet and outlet passages in parallel to the filter, and a fluid-pressure-responsive relief valve positioned across the relief passage, and comprising a valve seat and a substantially non-distensible annular frustoconical spring disk, a portion of whose surface seals against the valve seat and is biased thereagainst to close off the relief passage, one face of the disk being exposed to inlet fluid pressure and the other face of the disk being exposed to fluid pressure in the relief passage and an edge portion of the disk arranged to move away from the valve seat at a predetermined fluid pressure differential across the faces of the disk, to expose a passage between the disk and the valve seat, whereby fluid is permitted to flow through the relief passage from the inlet to the outlet passage, thus bypassing the filter.

2. A filter assembly in accordance with claim 1, in which the passage between the disk and the valve seat is formed at the outer edge of the disk.

3. A filter assembly in accordance with claim 1, in which the passage between the disk and the valve seat is formed at the central portion of the disk.

4. A filter assembly in accordance with claim 1, in which the disk is bowed against the direction of fluid flow against the valve.

5. A filter assembly in accordance with claim 1, in which the frustoconical spring disk is radially tapered, with one edge thicker than the other.

6. A filter assembly in accordance with claim 1, in which the spring disk is a Belleville washer.

7. A filter assembly in accordance with claim 1, in which the spring disk is surfaced with an inert resilient material.

8. A filter assembly in accordance with claim 1, in which the valve seat and spring disk are supported on the filter.

9. A filter assembly in accordance with claim 1, in which the valve seat and the spring disk are supported within a housing detachably mounted on the filter.

10. A filter assembly in accordance with claim 1, in which the spring disk is adapted at a predetermined pressure differential to flex out of engagement with the valve seat, and upon restoration of a predetermined pressure differential to return to its seated position automatically.

11. A filter assembly in accordance with claim 1, in which the spring disk is adapted to snap through and reverse the direction of bow in response to a predetermined fluid pressure differential.

References Cited by the Examiner

UNITED STATES PATENTS

| | | | |
|---|---|---|---|
| 2,311,320 | 2/1943 | Williams | 210—133 |
| 2,439,936 | 4/1948 | Kasten | 210—249 X |
| 2,521,891 | 9/1950 | Beams | 251—75 |
| 2,615,675 | 10/1952 | Mellert | 137—525 X |
| 2,731,154 | 1/1956 | Burnell | 210—130 |
| 3,146,194 | 8/1964 | Hathaway | 210—130 |

OTHER REFERENCES

Brecht, W. A. and Wahl, A. M.: The Radially Tapered Disc Spring, in ASME Research Publication, Paper 17, 1930.

Fortini, Earlwood T.: Conical-Disk Springs, in Machine Design, 30 (18); pages 139–145, September 4, 1958.

REUBEN FRIEDMAN, *Primary Examiner.*

F. SPEAR, *Assistant Examiner.*